United States Patent
Fang et al.

(10) Patent No.: US 12,490,366 B2
(45) Date of Patent: Dec. 2, 2025

(54) DIMMING SYSTEM BASED ON POWER LINE CARRIER AND DIMMING AND COLOR ADJUSTING CONTROL METHOD

(71) Applicant: Zhuhai Shengchang Electronics Co., Ltd., Zhuhai (CN)

(72) Inventors: Yizhou Fang, Jieyang (CN); Dehua Zheng, Zhuhai (CN)

(73) Assignee: Zhuhai Shengchang Electronics Co., Ltd., Zhuhai (CN)

( * ) Notice: Subject to any disclaimer, the term of this patent is extended or adjusted under 35 U.S.C. 154(b) by 45 days.

(21) Appl. No.: 18/751,682

(22) Filed: Jun. 24, 2024

(65) Prior Publication Data

US 2025/0294660 A1    Sep. 18, 2025

(30) Foreign Application Priority Data

Mar. 14, 2024  (CN) .................. 202410289602.7

(51) Int. Cl.
*H05B 47/185*  (2020.01)
*H05B 45/31*   (2020.01)

(52) U.S. Cl.
CPC .......... *H05B 47/185* (2020.01); *H05B 45/31* (2020.01)

(58) Field of Classification Search
CPC ...... H05B 47/185; H05B 45/10; H05B 45/20; H05B 45/30; H05B 45/325; H05B 47/19; H05B 45/31–315; H05B 45/44–48; H05B 45/50–52
See application file for complete search history.

(56) References Cited

U.S. PATENT DOCUMENTS

| | | | | |
|---|---|---|---|---|
| 2016/0088697 A1* | 3/2016 | Yan | .......................... | H05B 45/10 |
| | | | | 315/307 |
| 2016/0100466 A1* | 4/2016 | Kim | ....................... | H05B 47/17 |
| | | | | 315/250 |
| 2022/0201820 A1* | 6/2022 | Kumar | ............... | H05B 45/3577 |

FOREIGN PATENT DOCUMENTS

| | | |
|---|---|---|
| CN | 202603015 U | 12/2012 |
| CN | 112954849 A | 6/2021 |
| CN | 219981093 U | 11/2023 |

* cited by examiner

*Primary Examiner* — Renan Luque
(74) *Attorney, Agent, or Firm* — George D. Morgan

(57) ABSTRACT

The present invention discloses a dimming system based on a power line carrier and a dimming and color adjusting control method. The dimming system includes a phase-cut carrier controller, a main power supply, a dimming detection circuit, a color temperature adjusting detection circuit, a signal processing circuit, a first driving circuit, a second driving circuit, an MOS transistor Q1 and an MOS transistor Q2. Through the above structure, a waveform of waves in each cycle, input to a phase-cut dimming and color adjusting driver by a power frequency AC, is reserved, and there is no situation where the entire half wave is chopped. Therefore, each half wave input by the power frequency AC charges energy storage capacitors inside circuits, making the energy storage capacitor of the main power supply smaller and keeping required maintenance time for output of a lamp.

8 Claims, 7 Drawing Sheets

DIMMING SYSTEM BASED ON POWER LINE CARRIER AND DIMMING AND COLOR ADJUSTING CONTROL METHOD

CROSS-REFERENCE TO RELATED APPLICATIONS

The application claims priority to Chinese patent application No. 2024102896027, filed on Mar. 14, 2024, the entire contents of which are incorporated herein by reference.

TECHNICAL FIELD

The present invention relates to the technical field of color adjustment, in particular to a dimming system based on a power line carrier and a dimming and color adjusting control method.

BACKGROUND

With the popularization of an intelligent lighting market, intelligent LED lamps are widely used in smart homes. However, in order to reflect that the LED lamps are easy to operate and the LED lamps can achieve dimming and color adjusting functions, traditional phase-cut dimming in houses has defects of being relatively single and not capable of being compatible with color adjusting functions.

In order to cater to the advantage that dimming and color adjusting can be achieved at the same time, both bus communication technologies (DALI, KNX, RS485, etc.) and wireless communication technologies (ZIGBEE, BLE, etc.) on the market have some defects. Because in the prior art, using wall switches for dimming is a common solution for design of a lighting system, the bus communication technologies are complex and costly in wiring. When old houses are upgraded, wireless control is not compatible with traditional wall switches, has poor stability and has other defects, which does not reflect that the LED lamp is easy to operate and stable.

Therefore, there is an urgent need for a dimming system based on a power line carrier and a dimming and color adjusting control method to solve the above problems.

SUMMARY

The present invention aims to at least solve one of technical problems existing in the prior art. Therefore, the present invention provides a dimming system based on a power line carrier and a dimming and color adjusting control method.

In order to solve the technical problem, one embodiment of the present invention adopts the technical solution: the dimming system based on a power line carrier includes a phase-cut carrier controller, a main power supply, a dimming detection circuit, a color temperature adjusting detection circuit, a signal processing circuit, a first driving circuit, a second driving circuit, an MOS transistor Q1 and an MOS transistor Q2, where an input terminal of the phase-cut carrier controller is connected to an AC power supply and connected to a control signal;
the main power supply is connected to an output terminal of the phase-cut carrier controller;
the dimming detection circuit and the color temperature adjusting detection circuit are connected between the output terminal of the phase-cut carrier controller and an input terminal of the signal processing circuit;
the first driving circuit is connected between an output terminal of the signal processing circuit and a grid electrode of the MOS transistor Q1, the second driving circuit is connected between the output terminal of the signal processing circuit and a grid electrode of the MOS transistor Q2, and a source electrode of the MOS transistor Q1 and a source electrode of the MOS transistor Q2 are grounded; and
a first LED lamp is connected between an output terminal of the main power supply and a drain electrode of the MOS transistor Q1, and a second LED lamp is connected between the output terminal of the main power supply and a drain electrode of the MOS transistor Q2.

As one of the preferred embodiments of the present invention, the dimming system based on a power line carrier further includes an EMC circuit and a rectification and filtering circuit which are sequentially connected in series between the output terminal of the phase-cut carrier controller and an input terminal of the main power supply.

As one of the preferred embodiments of the present invention, the dimming system based on a power line carrier further includes a plurality of potentiometers connected to the input terminal of the phase-cut carrier controller to generate the control signal.

As one of the preferred embodiments of the present invention, the dimming system based on a power line carrier further includes a plurality of encoders connected to the input terminal of the phase-cut carrier controller to generate the control signal.

As one of the preferred embodiments of the present invention, the dimming system based on a power line carrier further includes a plurality of buttons connected to the input terminal of the phase-cut carrier controller to generate the control signal.

As one of the preferred embodiments of the present invention, the dimming system based on a power line carrier further includes a touch dimming circuit connected to the input terminal of the phase-cut carrier controller to generate the control signal.

As one of the preferred embodiments of the present invention, the dimming system based on a power line carrier further includes a wireless signal dimming circuit connected to the input terminal of the phase-cut carrier controller to generate the control signal.

A dimming control method applied to the dimming system includes the following steps:

S1. defining a control signal data frame, where the control signal data frame includes a start flag, a data unit, and an end tag, the start flag includes N codes, the data unit includes M codes, the end tag includes K codes, and the start flag represents dimming control or color temperature adjusting control;

S2. chopping each half wave in which an AC power frequency signal is input, by the phase-cut carrier controller, and reducing a waveform of a chopped part of a half wave signal to represent the code "1", where the half wave signal which is chopped but not subjected to waveform reducing is used to represent the code "0";

S3. transmitting the encoded AC power frequency signal to the dimming detection circuit and the color temperature adjusting detection circuit for decoding, and transmitting a decoded signal to the signal processing circuit; and S4. adjusting size of a PWM duty ratio output to the first driving circuit and/or the second driving circuit by the signal processing circuit according to the chopped signal to adjust brightness or color temperature of the first LED lamp and/or the second LED lamp.

The present invention has the beneficial effects that for the dimming system based on a power line carrier and the dimming and color adjusting control method, the dimming system includes the phase-cut carrier controller, the main power supply, the dimming detection circuit, the color temperature adjusting detection circuit, the signal processing circuit, the first driving circuit, the second driving circuit, the MOS transistor Q1 and the MOS transistor Q2. Through the above structure, a waveform of waves in each cycle, input to a phase-cut dimming and color adjusting driver by a power frequency AC, is reserved, and there is no situation where the entire half wave is chopped. Therefore, each half wave input by the power frequency AC charges energy storage capacitors inside circuits, making the energy storage capacitor of the main power supply smaller and keeping required maintenance time for output of a lamp, which is conducive to miniaturization of the dimming and color adjusting driver.

BRIEF DESCRIPTION OF DRAWINGS

The above and/or additional aspects and advantages of the present invention will become apparent and easy to understand from the description of embodiments in conjunction with the following drawings, where.

DETAILED DESCRIPTION OF THE EMBODIMENTS

Figure 1A:
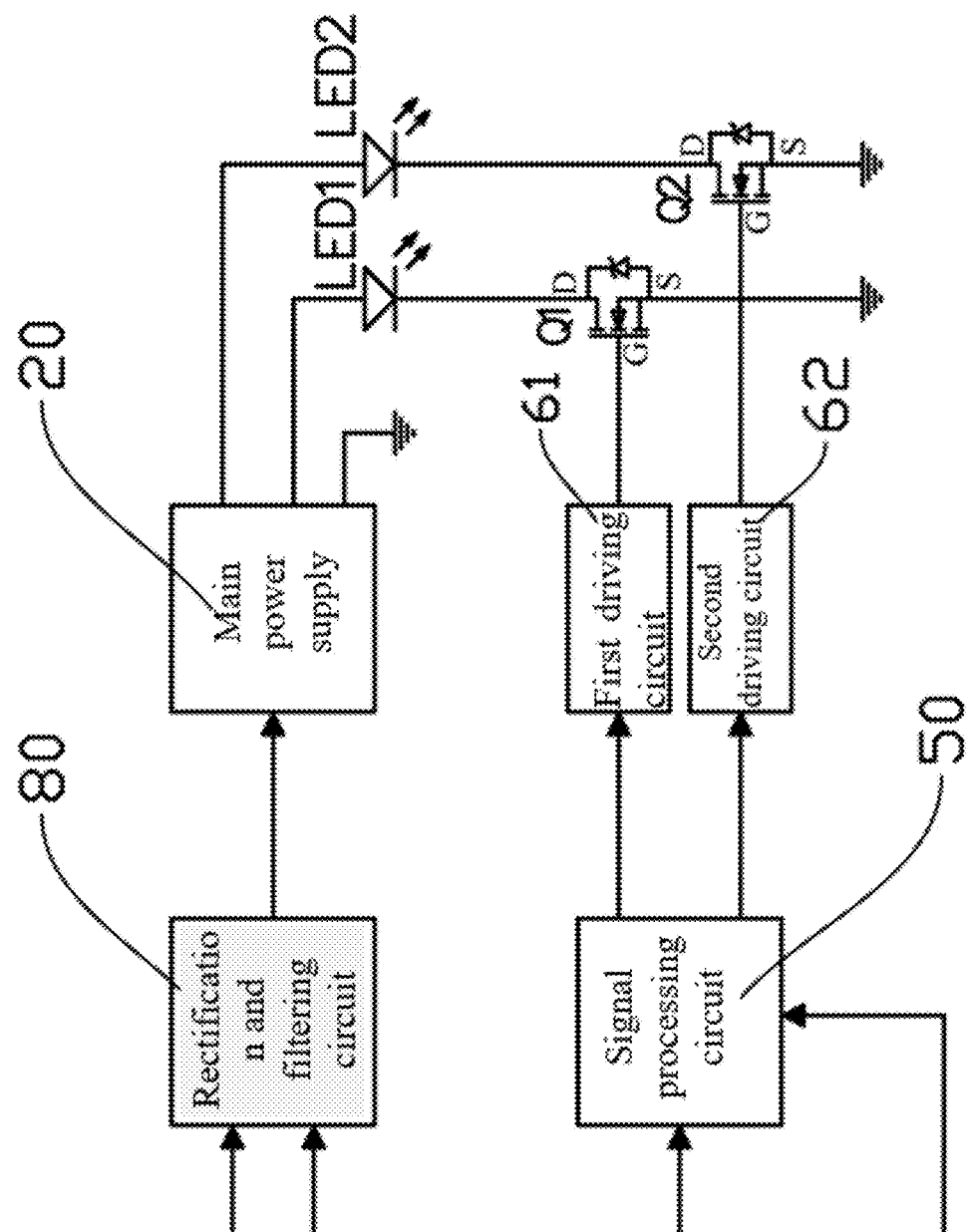
FIGS. 1A and 1B shows a schematic block diagram of a dimming system based on a power line carrier.

This part will describe the specific embodiments of the disclosure in detail. The preferred embodiments of the disclosure are shown in the accompanying drawings, and the function of the drawings is to supplement the description of the text part with graphics, which enables people to intuitively and vividly understand each technical feature and the overall technical solutions of the disclosure, but cannot be understood as limiting the scope of protection of the disclosure.

In the description of the present invention, "a plurality of" means more than two, "greater than a number", "less than a number", "exceed a number" and the like indicate that the number is excluded, and "above a number", "below a number", "within a number", and the like indicate that the number is included. "First" and "second" are intended only for distinguishing between technical features but cannot be used to indicate or imply relative importance or implicitly specify a quantity of indicated technical features or implicitly specify a sequential relationship of indicated technical features.

In the description of the present invention, it should be understood that the positional descriptions referred to, for example, the directional or positional relationships indicated by up, down, front, rear, left, right, etc., are based on the directional or positional relationships shown in the drawings, and are only for convenience and simplification of description of the disclosure, but not for indicating or implying that the referred device or element must have a specific direction, be constructed and operated in a specific direction, and thus should not be construed as limiting the disclosure.

In the present invention, unless otherwise expressly defined, the terms such as "arranged", "mounted", and "connected" should be understood in a broad sense. For example, it can be directly connected or indirectly connected through intermediate media; it can be in fixed connection, detachable connection, or integrated molding; it can be in mechanical connection; and it can be internal connectivity of two components or the interaction relationship between two components. For persons of ordinary skill in the art, specific meanings of the terms in the disclosure may be appropriately determined with reference to the specific content in the technical solution.

Referring to FIGS. 1 to 4, a dimming system based on a power line carrier includes a phase-cut carrier controller 10, a main power supply 20, a dimming detection circuit 30, a color temperature adjusting detection circuit 40, a signal processing circuit 50, a first driving circuit 61, a second driving circuit 62, an MOS transistor Q1 and an MOS transistor Q2, where an input terminal of the phase-cut carrier controller 10 is connected to an AC power supply and connected to a control signal;

the main power supply 20 is connected to an output terminal of the phase-cut carrier controller 10;

the dimming detection circuit 30 and the color temperature adjusting detection circuit 40 are connected between the output terminal of the phase-cut carrier controller 10 and an input terminal of the signal processing circuit 50;

the first driving circuit 61 is connected between an output terminal of the signal processing circuit 50 and a grid electrode of the MOS transistor Q1, the second driving circuit 62 is connected between the output terminal of the signal processing circuit 50 and a grid electrode of the MOS transistor Q2, and a source electrode of the MOS transistor Q1 and a source electrode of the MOS transistor Q2 are grounded; and the first LED lamp is connected between an output terminal of the main power supply 20 and a drain electrode of the MOS transistor Q1, and a second LED lamp is connected between the output terminal of the main power supply 20 and a drain electrode of the MOS transistor Q2, where preferably, the first LED lamp (LED1) and the second LED lamp (LED2) are low color temperature beads and high color temperature beads, respectively, which can be integrated or independent LED lamps.

Figure 2:
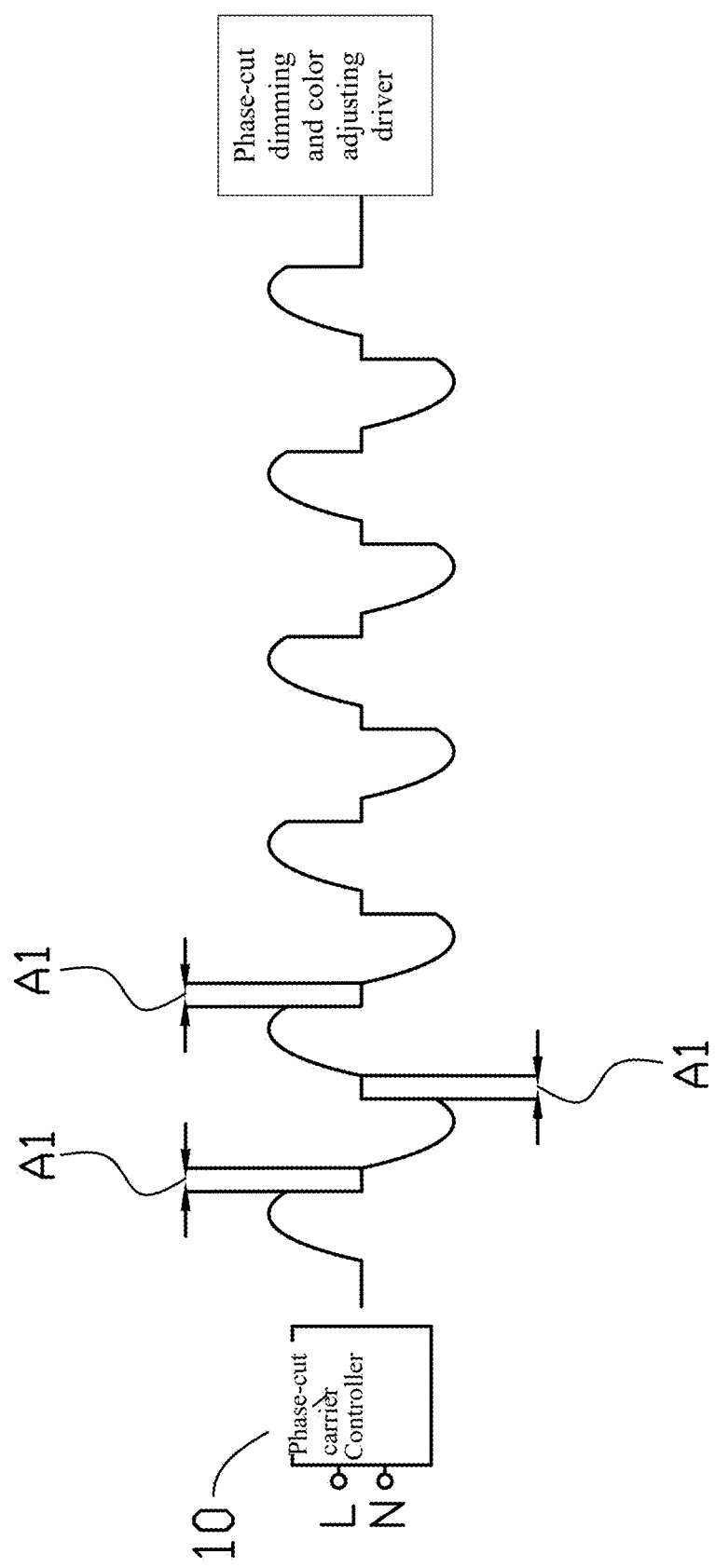
FIG. 2 shows a waveform diagram of a dimming system based on a power line carrier during dimming.
Figure 3:
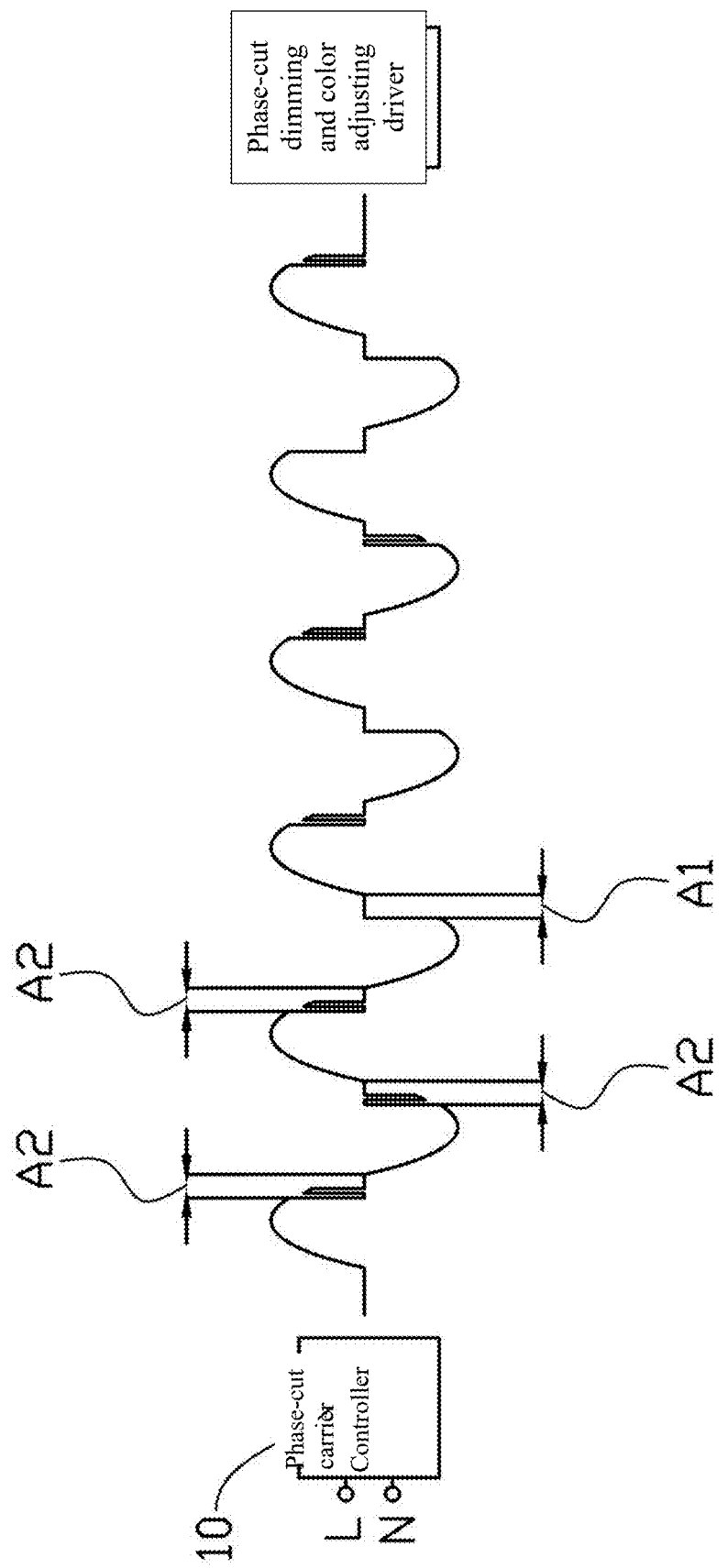
FIG. 3 shows a waveform diagram of a dimming system based on a power line carrier during color temperature adjustment.

In the present invention, referring to FIGS. 2-3, first, a control signal data frame is defined, and includes a start flag, a data unit, and an end tag, where the start flag includes N codes, the data unit includes M codes, the end tag includes K codes, the start flag represents dimming control or color temperature adjusting control. Specifically, the start flag can define any control type arbitrarily, such as 101b for dimming control, 111b for color temperature adjusting control, or any defined function. For example, if there are buttons 1 to N, they are controlled for different color temperature save states, and each button saves its corresponding color temperature state. When the button is pressed, the corresponding color temperature is output. Certainly, the codes at bits of the start flag are not limited to current definition and can be defined arbitrarily.

Figure 1B:
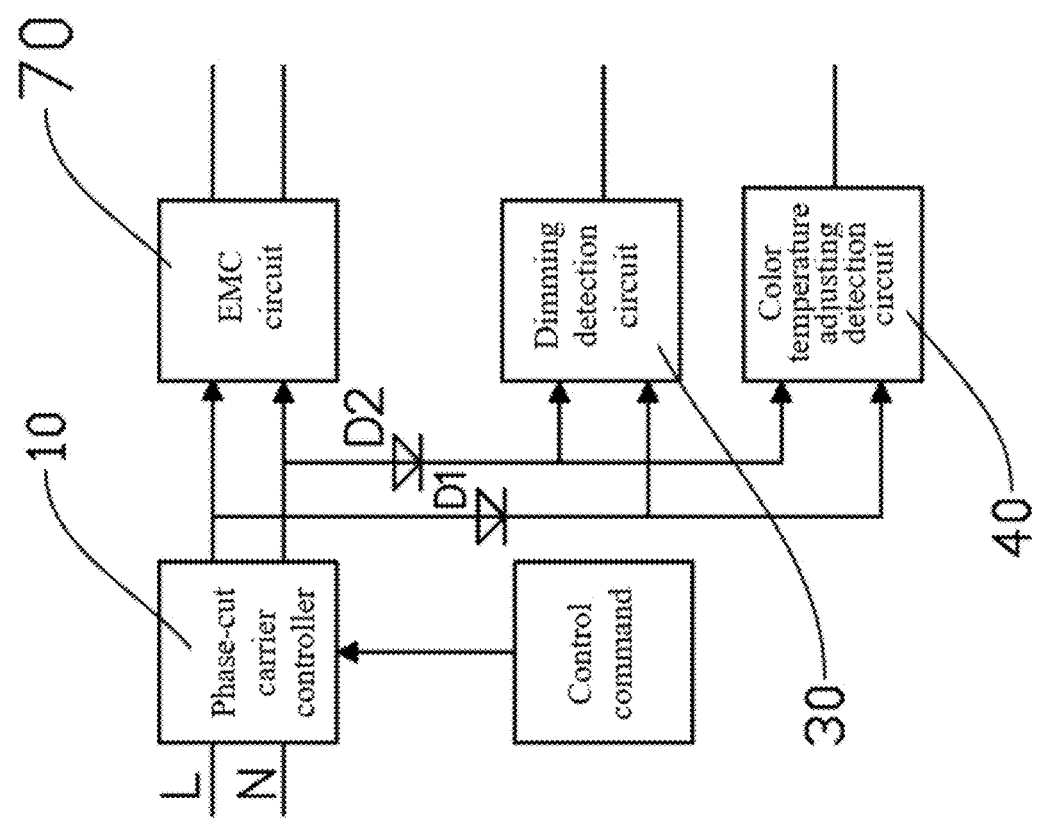
Figure 4A:
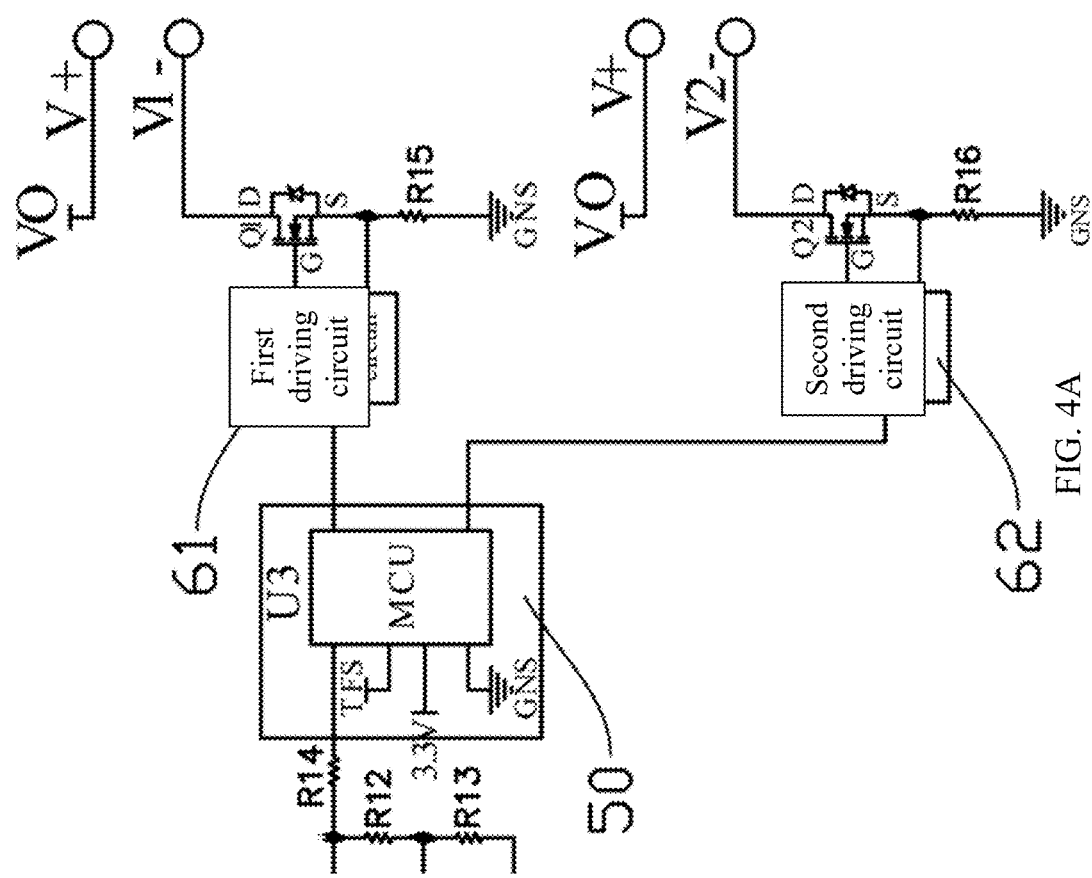
FIGS. 4A, 4B and 4C shows a schematic diagram of a partial circuit of a dimming system based on a power line carrier.
Figure 4B:
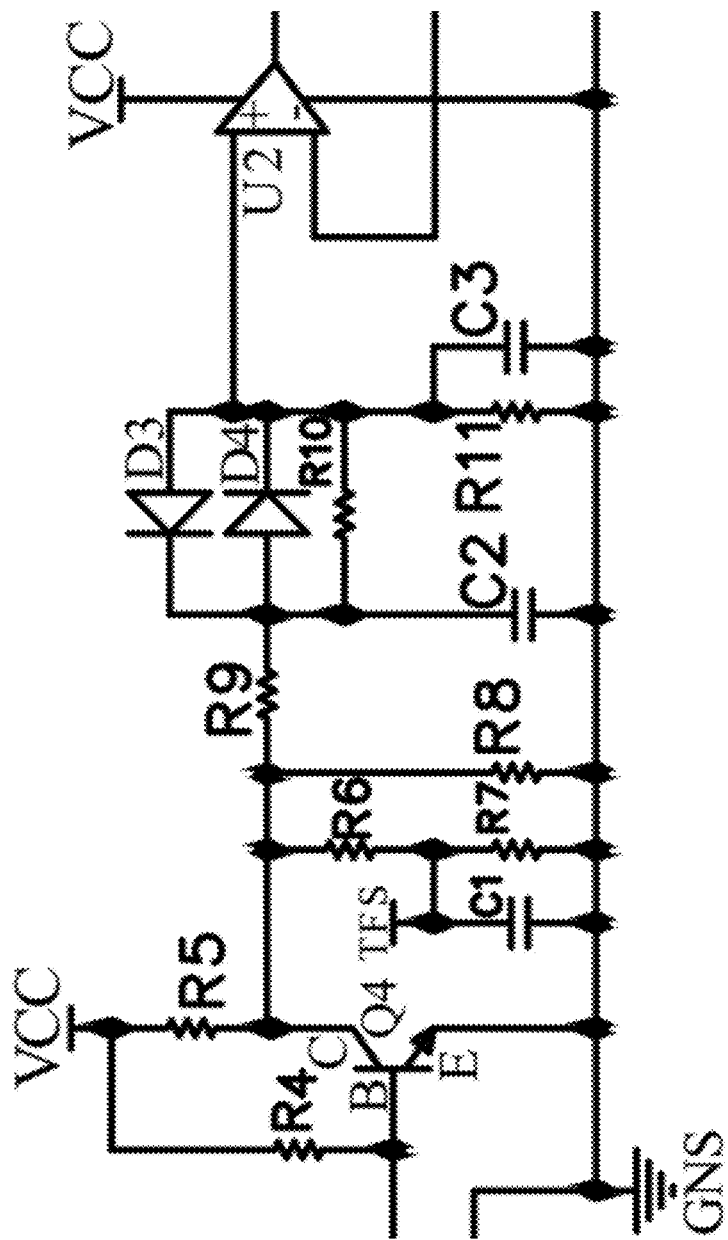
Figure 4C:
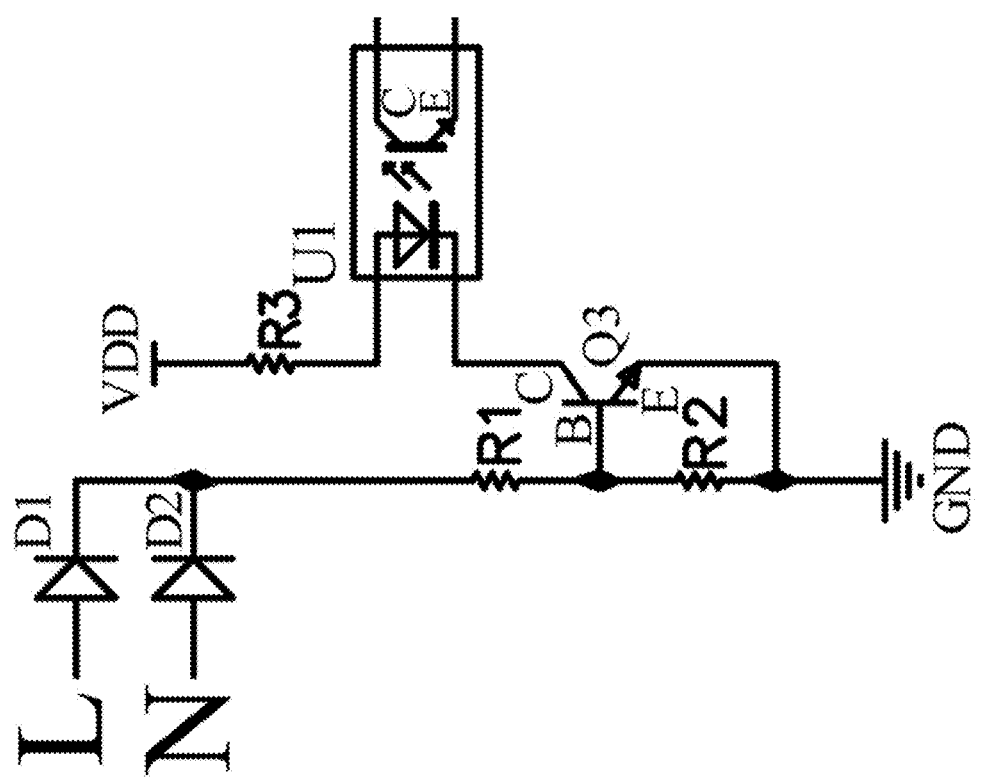

1) Referring to FIGS. 1-2 and 4, when the control signal is a dimming signal, the phase-cut carrier controller 10 will perform fixed chopping on each half wave in which the AC power frequency signal is input, based on the control signal (an A1 area in FIG. 2), and then the chopped signal is transmitted to the EMC circuit 70, the rectification and filtering circuit 80, and the main power supply 20, and finally, output to the first LED lamp (LED1) and the second LED lamp (LED2). FIGS. 4A, 4B and 4C shows the schematic diagram of the circuit of the dimming detection circuit 30, the color temperature adjusting detection circuit 40, the signal processing circuit 50, the first driving circuit 61, the second driving circuit 62, the MOS transistor Q1 and the MOS transistor Q2 in the present invention; specifically, the AC power frequency signal (a live line L, a zero line N) after chopping is also rectified by a diode D1 and a diode D2 to divide voltage of a resistor R1 and a resistor R2, and when voltage drop at two ends of the resistor R2 is greater than conduction voltage drop of an BE electrode of a transistor Q3, the transistor Q3 is in a turn-on state; when the voltage drop at the two ends of the resistor R2 is less than the conduction voltage drop of the BE electrode of the transistor Q3, the transistor Q3 is in a turn-off state (the less a part of each half wave of the AC input power frequency signal is cut off, the longer the time it takes for the resistor R2 to maintain conduction of the transistor Q3 obtained from voltage division, and the brighter the lamp is finally; the more each half wave of the AC input power frequency signal is cut off, the shorter the time it takes for the resistor R2 to maintain conduction of the transistor Q3 obtained from voltage division, and the darker the lamp is finally), whereby a PWM signal state will be generated here; when the transistor Q3 is conductive, VDD voltage passes through the resistor R3 and a primary electrode of an optocoupler U1 (to make it emit light), as well as a CE electrode of the transistor Q3 to be grounded (GND), current flows through the primary electrode of the optocoupler U1, a photosensitive transistor of a secondary electrode of the optocoupler U1 is conductive, the VDD voltage flows to a C electrode of the photosensitive transistor of the secondary electrode of the optocoupler U1 and a B electrode of a transistor Q4 through a bias resistor R4, and an E electrode of the photosensitive transistor of the secondary electrode of the optocoupler U1 is grounded (GNS), whereby voltage of the B electrode of the transistor Q4 is lowed, the transistor Q4 is turned off, besides, the VCC voltage is connected to the C electrode of the transistor Q4 through a current limiting resistor R5, and the C electrode of the transistor Q4 is at a high level; when the transistor Q3 is in the turn-off state, because the primary electrode of the optocoupler U1 is non-conductive, the photosensitive transistor of the secondary electrode of the optocoupler U1 is turned off, the VDD voltage flows to the C electrode of the photosensitive transistor of the secondary electrode of the optocoupler U1 and the B electrode of the transistor Q4 through the bias resistor R4, at this time, the B electrode of the transistor Q4 is at a high level, and the transistor Q4 is turned on; besides, the VCC voltage is connected to the C electrode of the transistor Q4 through the current limiting resistor R5, the E electrode of the transistor Q4 is grounded (GNS), and voltage at the C electrode of the transistor Q4 is lowered, whereby the C electrode of the transistor Q4 is also in a PWM signal state; a PWM waveform is input to an in-phase input terminal of an operational amplifier U2 through voltage division of a resistor R8, a resistor R9, a resistor R10 and a resistor R11, as well as filtering of a capacitor C2 and a capacitor C3 (the diode D4 provides a voltage signal to the in-phase input terminal of the operational amplifier U2 for acceleration when just being powered on, and the diode D3 accelerates discharge of voltage of the in-phase input terminal of the operational amplifier U2 when being powered off). An output terminal of the operational amplifier U2 is connected to an inverting input terminal of the operational amplifier U2 through a resistor R12, and then is grounded (GNS) through a resistor R13. The output terminal of the operational amplifier U2 is connected to the signal processing circuit 50 (MCU processor U3) through a resistor R14; after the signal processing circuit 50 determines the size of input voltage (if the voltage is greater than a set maximum value, the PWM signal output is 100%; if the voltage is less than the set minimum value, the PWM signal output is 0; if the input signal voltage is between the set maximum value and the set minimum value, the PWM output is proportional to the output duty cycle), determining whether to adjust the brightness or color temperature is based on detection of the PWM waveform through the resistor R6, the resistor R7, and the capacitor C1; if each cycle is one PWM, dimming control is needed; if a small PWM is also embedded in each cycle, color temperature adjustment is needed; the size of the PWM duty cycle output to the first driving circuit 61 and/or the second driving circuit 62 is determined based on signal size; and the more the parts of each half wave of the AC input power frequency signal are cut off, the smaller the PWM percentage output by the signal processing circuit 50 is, and the smaller the PWM duty cycle of the MOS transistor Q1 and/or the MOS transistor Q2 is, and the smaller the current flowing through the lamp is, which achieves the effect of controlling the brightness of an output lamp to darken, and vice versa.

2) Referring to FIGS. 1, 3-4, when the control signal is a color temperature adjusting signal, the phase-cut carrier controller 10 will perform fixed chopping on each half wave in which the AC power frequency signal is input, based on the control signal, for the part of each half wave of AC power frequency electricity, after being subjected to fixed chopping, the AC power frequency signal is reduced (an A2 area in FIG. 3), and further the code 1 is expressed; the half wave (an A1 area in FIG. 3) where parts of the AC power frequency signal have been chopped but no AC power frequency signal is reduced, is used for expressing the code 0, and then the half wave is transmitted to the EMC circuit 70, the rectification and filtering circuit 80, and the main power supply 20, and finally, output to the first LED lamp (LED1) and/or the second LED lamp (LED2). FIGS. 4A, 4B and 4C shows the schematic diagram of the circuit of the dimming detection circuit 30, the color temperature adjusting detection circuit 40, the signal processing circuit 50, the first driving circuit 61, the second driving circuit 62, the MOS transistor Q1 and the MOS transistor Q2 in the present invention; specifically, the AC power frequency signal (the live line L, the zero line N) after encoding is also rectified by the diode D1 and the diode D2 to divide voltage of the resistor R1 and the resistor R2; when voltage drop at two ends of the resistor R2 is greater than conduction voltage drop of the BE electrode of the transistor Q3, the transistor Q3 is in a turn-on state; when the voltage drop at two ends of the resistor R2 is less than the conduction voltage drop of the BE electrode of the transistor Q3, the transistor Q3 is in a turn-off state (the less parts of each half wave of the AC input power frequency signal are cut off, the longer the time it takes for the resistor R2 to maintain the conduction of the Q1 obtained from voltage division, and the brighter the lamp is finally; the more parts of each half wave of the AC input power frequency signal are cut off, the shorter the time it takes for the resistor R2 to maintain conduction of the Q1 obtained from voltage division, and the darker the lamp is finally), whereby a PWM signal state will be generated here; because some of the part of each half wave after being subjected to fixed chopping of the AC power frequency during color temperature adjusting is reduced to the AC power frequency signal, a large PWM signal is embedded with a small PWM here (rectified from the reduced AC power frequency signal); when the transistor Q3 is in a conductive state, VDD voltage passes through the resistor R3 and the primary electrode of an optocoupler U1 (to make it emit light), as well as the CE electrode of the transistor Q3 to be grounded (GND), current flows through the primary electrode of the optocoupler U1, a photosensitive transistor of the secondary electrode of the optocoupler U1 is conductive, the VDD voltage flows to the C electrode of the photosensitive transistor of the secondary electrode of the optocoupler U1 and the B electrode of the transistor Q4 through the bias resistor R4, and the E electrode of the photosensitive transistor of the secondary electrode of the optocoupler U1 is grounded (GNS), whereby voltage of the B electrode of the transistor Q4 is lowed, the transistor Q4 is turned off, besides, the VCC voltage is connected to the C electrode of the transistor Q4 through the current limiting resistor R5, and the C electrode of the transistor Q4 is at a high level; when the transistor Q3 is in the turn-off state, because the primary electrode of the optocoupler U1 is non-conductive, the photosensitive transistor of the secondary electrode of the optocoupler U1 is turned off, the VDD voltage flows to the C electrode of the photosensitive transistor of the secondary electrode of the optocoupler U1 and the B electrode of the transistor Q4 through the bias resistor R4 at this time, the B electrode of the transistor Q4 is at a high level, and the transistor Q4 is turned on; besides, the VCC voltage is connected to the C electrode of the transistor Q4 through the current limiting resistor R5, the E electrode of the transistor Q4 is grounded (GNS), and voltage at the C electrode of the transistor Q4 is lowered, whereby the C electrode of the transistor Q4 is also in a PWM signal state;

(1) after voltage division by a resistor R6, a resistor R7, and a capacitor C1, the PWM waveform is sampled by the signal processing circuit 50 (MCU processor U3). The signal processing circuit 50 determines whether to adjust brightness or color temperature based on the PWM waveform here. When only one large PWM signal exists, the brightness is adjusted, and when the large PWM signal is embedded with the small PWM signal, the color temperature is adjusted. The size of the PWM1 and PWM2 (transmitted to the first driving circuit 61 and the second driving circuit 62, respectively) output from the color temperature depends on how many codes programmed by control signals decoded by an MCU on the power frequency AC;

(2) a PWM waveform is input to the in-phase input terminal of the operational amplifier U2 through voltage division of the resistor R8, the resistor R9, the resistor R10 and the resistor R11, as well as filtering of the capacitor C2 and the capacitor C3 (the diode D4 provides a voltage signal to the in-phase input terminal of the operational amplifier U2 for acceleration when just being powered on, and the diode D3 accelerates discharge of voltage of the in-phase input terminal of the operational amplifier U2 when being turned off). The output terminal of the operational amplifier U2 is connected to the inverting input terminal of the operational amplifier U2 through a resistor R12, and then is grounded (GNS) through the resistor R13. The output terminal of the operational amplifier U2 is connected to the signal processing circuit 50 (MCU) through the resistor R14; After determining the size of input voltage, the MCU outputs the PWM signal to the first driving circuit 61, or outputs another PWM signal to the second driving circuit 62, to turn on or off the duty cycle of the MOS transistor Q1 or the duty cycle of the MOS transistor Q2; in the color temperature adjusting state, the brightness is not changed, only a change between cold light and warm light exists; where TFS at connection parts of the resistor R6, the resistor R7, and the capacitor C1 is sampling physically connected to the MCU processor U3; when output V+ and output V1− are short circuited or overloaded, a spike voltage signal is generated at connection parts of a resistor R15 and an S electrode of the MOS transistor Q1; when the voltage exceeds a set value, PWM drives the first driving circuit 61 to close the output, and the MOS transistor Q1 is turned off, providing overload protection and short circuit protection; and when output V+ and output V2− are short circuited or overloaded, a spike voltage signal is generated at connection parts of a resistor R16 and an S electrode of the MOS transistor Q2; when the voltage exceeds the set value, PWM drives the second driving circuit 62 to close the output, and the MOS transistor Q2 is turned off, providing overload protection and short circuit protection.

The present invention has the advantages that a waveform of waves in each cycle, input to the phase-cut dimming and color adjusting driver, by the power frequency AC, is reserved, and there is no situation where the entire half wave is chopped. Therefore, each half wave input by the power frequency AC flows through the EMC circuit 70 and the rectification and filtering circuit 80, and then charges the energy storage capacitor inside the circuit; each half wave has a current flowing into the energy storage capacitor, whereby even the energy storage capacitor of the main power supply 20 is smaller, required maintenance time for output of the lamp can also be kept, which is conducive to the miniaturization of the dimming and color adjusting driver.

Preferably, the dimming system based on power line carrier further includes the EMC circuit 70 and the rectification and filtering circuit 80 which are sequentially connected in series between the output terminal of the phase-cut carrier controller 10 and the input terminal of the main power supply 20.

As a first embodiment for generating the control signal, the dimming system based on a power line carrier further includes a plurality of potentiometers connected to the input terminal of the phase-cut carrier controller 10 to generate the control signal.

As a second embodiment for generating the control signal, the dimming system based on a power line carrier further includes a plurality of encoders connected to the input terminal of the phase-cut carrier controller 10 to generate the control signal.

The dimming system based on a power line carrier further includes a plurality of buttons connected to the input terminal of the phase-cut carrier controller 10 to generate the control signal.

As a third embodiment for generating the control signal, the dimming system based on a power line carrier further includes a touch dimming circuit connected to the input terminal of the phase-cut carrier controller 10 to generate the control signal.

As a fourth embodiment for generating the control signal, the dimming system based on a power line carrier further includes a wireless signal dimming circuit connected to the input terminal of the phase-cut carrier controller 10 to generate the control signal.

A dimming control method applied to the dimming system includes the following steps:

S1. defining a control signal data frame, where the control signal data frame includes a start flag, a data unit, and an end tag, the start flag includes N codes, the data unit includes M codes, the end tag includes K codes, and the start flag represents dimming control or color temperature adjusting control;

S2. chopping each half in which an AC power frequency signal is input, by the phase-cut carrier controller 10, and reducing a waveform of the chopped part of the half wave signal to represent the code "1", where the half wave signal which is chopped but not subjected to waveform reducing is used to represent the code "0";

S3. transmitting the encoded AC power frequency signal to the dimming detection circuit 30 and the color temperature adjusting detection circuit 40 for decoding, and transmitting the decoded signal to the signal processing circuit 50; and S4. adjusting the size of the PWM duty ratio output to the first driving circuit 61 and/or the second driving circuit 62 by the signal processing circuit 50 according to the chopped signal to adjust brightness or color temperature of the first LED lamp and/or the second LED lamp.

Of course, the present invention is not limited to the above-mentioned implementation. Those skilled in the art may also make equivalent modifications or replacements without violating the spirit of the present invention. These equivalent modifications and replacements all fall within the scope of the claims of the present application.

What is claimed is:

1. A dimming system based on a power line carrier, comprising a phase-cut carrier controller (10), a main power supply (20), a dimming detection circuit (30), a color temperature adjusting detection circuit (40), a signal processing circuit (50), a first driving circuit (61), a second driving circuit (62), an MOS transistor Q1 and an MOS transistor Q2, wherein an input terminal of the phase-cut carrier controller (10) is connected to an AC power supply and connected to a control signal;

the main power supply (20) is connected to an output terminal of the phase-cut carrier controller (10);

the dimming detection circuit (30) and the color temperature adjusting detection circuit (40) are connected between the output terminal of the phase-cut carrier controller (10) and an input terminal of the signal processing circuit (50);

the first driving circuit (61) is connected between an output terminal of the signal processing circuit (50) and a grid electrode of the MOS transistor Q1, the second driving circuit (62) is connected between the output terminal of the signal processing circuit (50) and a grid electrode of the MOS transistor Q2, and a source electrode of the MOS transistor Q1 and a source electrode of the MOS transistor Q2 are grounded; and a first LED lamp is connected between an output terminal of the main power supply (20) and a drain electrode of the MOS transistor Q1, and a second LED lamp is connected between the output terminal of the main power supply (20) and a drain electrode of the MOS transistor Q2.

2. The dimming system based on a power line carrier according to claim 1, further comprising an EMC circuit (70) and a rectification and filtering circuit (80) which are sequentially connected in series between the output terminal of the phase-cut carrier controller (10) and the input terminal of the main power supply (20).

3. The dimming system based on a power line carrier according to claim 1, further comprising a plurality of potentiometers connected to the input terminal of the phase-cut carrier controller (10) to generate the control signal.

4. The dimming system based on a power line carrier according to claim 1, further comprising a plurality of encoders connected to the input terminal of the phase-cut carrier controller (10) to generate the control signal.

5. The dimming system based on a power line carrier according to claim 1, further comprising a plurality of buttons connected to the input terminal of the phase-cut carrier controller (10) to generate the control signal.

6. The dimming system based on a power line carrier according to claim 1, further comprising a touch dimming circuit connected to the input terminal of the phase-cut carrier controller (10) to generate the control signal.

7. The dimming system based on a power line carrier according to claim 1, further comprising a wireless signal dimming circuit connected to the input terminal of the phase-cut carrier controller (10) to generate the control signal.

8. A dimming control method applied to the dimming system of claim 1, comprising the following steps:

S1. defining a control signal data frame, wherein the control signal data frame comprises a start flag, a data unit, and an end tag, the start flag comprises N codes, the data unit comprises M codes, the end tag comprises K codes, and the start flag represents dimming control or color temperature adjusting control;

S2. chopping each half wave in which an AC power frequency signal is input, by the phase-cut carrier controller (10) and reducing a waveform of a chopped part of a half wave signal to represent the code "1", wherein the half wave signal which is chopped but not subjected to waveform reducing is used to represent the code "0";

S3. transmitting the encoded AC power frequency signal to the dimming detection circuit (30) and the color temperature adjusting detection circuit (40) for decoding, and transmitting a decoded signal to the signal processing circuit (50); and S4. adjusting size of a PWM duty ratio output to the first driving circuit (61) and/or the second driving circuit (62) by the signal processing circuit (50) according to the chopped signal to adjust brightness or color temperature of the first LED lamp and/or the second LED lamp.

* * * * *